3,060,090
PYRAZOLIDINE-QUINAZOLONE THERAPEUTIC COMPOSITION
Bernard A. Becker, Rochester, N.Y., assignor to Wallace & Tiernan Inc., Belleville, N.J., a corporation of Delaware
No Drawing. Filed Feb. 1, 1961, Ser. No. 86,310
5 Claims. (Cl. 167—65)

The invention relates to therapeutically useful mixtures of certain 3,5-dioxo-pyrazolidines with certain 4-quinazolones.

In the menstrual cycle, if there is no pregnancy, the thickened walls (endometrium) of the uterus degenerate and rupture with local bleeding. The degenerated protein material of the uterus acts to trigger an inflammatory process. The tissues become inflamed and engorged with edema fluid, and hence, tender and painful. Up to now this condition has been treated with pain killer drugs and sometimes a diuretic to reduce edema. Occasionally a tranquilizer has been used in combination with either or both of the other drugs. It is my belief that administration of an anti-inflammatory drug approximately five to seven days before menstruation will reduce (antagonize) or prevent the inflammatory reaction and, thereby, reduce or prevent inflammation and edema formation so that engorgement, pain and related phenomena will be reduced or prevented from occurring. Aspirin has been used to relieve the pain but never in the amount necessary for an anti-inflammatory effect. So far as I know, the treating of the effect of the premenstrual tension syndrome and the reduction of edema by prevention or reduction of edema formation by administering an anti-inflammatory composition in an anti-inflammatory dosage amount has hitherto not been done.

I have discovered that the anti-inflammatory characteristics of 4 substituted phenyl and pyridyl-3,5-dioxo-pyrazolidines, such as phenyl butazone, pyridyl butazone and the like, are enhanced by the addition thereto of quinazolones such as 2-methyl-3-tolyl-4,1-quinazolones and 2 - methyl - 3 - (trifluoromethyl phenyl - 4 - quinazolones. These mixtures have been found to be particularly useful in lessening premenstrual tension.

Suitable compositions are the 3,5-dioxo-pyrazolidine having the formula

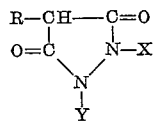

where R is a lower alkyl or carboxy lower alkyl group, such as methyl, ethyl, or butyl, carboxybutyl, carboxypropyl, X is phenyl or pyridyl or substituted phenyl or pyridyl, and Y is phenyl or pyridyl (the phenyl or pyridyl of X and Y being unsubstituted or substituted by halogen, a lower alkyl or an alkoxy radical containing 1–3 carbon atoms), and their pharmaceutically acceptable acid addition salts, mixed with a 4-quinazolone of the formula

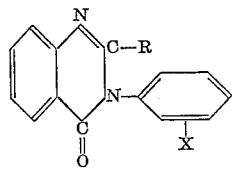

where R is hydrogen or a lower alkyl, such as methyl, ethyl, propyl or butyl, and X is hydrogen, lower alkyl, halogen or trifluoromethyl which may be in the ortho, meta, or para position, and their acid addition salts.

Examples of suitable 1,2-phenyl pyrazolidine compounds are shown in British Patent No. 646,597 and United States Patent No. 2,562,830. Examples of suitable 1,2-pyridyl compounds are shown in Michelson application Serial No. 41,488, filed July 8, 1960. Phenylbutazone, 1-phenyl-2-(2-pyridyl)-4-butyl-3,5-dioxopyrazolidine, 1 - phenyl - 2 - (4 - pyridyl) - 4 - butyl - 3,5 - dioxopyrazolidine, 1 - phenyl - 2 - (2 - pyridyl) - 4 - (1-carboxypropyl) - 3,5 - dioxopyrazolidine, and 1 - phenyl-2 - (4 - pyridyl) - 4 - (1 - carboxypropyl) - 4 - butyl-3,5 - dioxopyrazolidine have been found to be quite satisfactory, particularly in combination with the quinazolones above mentioned. Suitable quinazolones include the 2 - methyl - 3 - tolyl - 4 - quinazolones, 2 - methyl-3 - (chlorophenyl) - 4 - quinazolones, 2 - methyl - 3-(methylphenyl) - 4 - quinazolones, and the 2 - methyl - 3-(trifluoromethylphenyl) - 4 - quinazolones and others disclosed in Shetty et al. application Serial No. 13,690, filed March 9, 1960.

Resinates of the 4 substituted quinazolones can be prepared by agitating a suspension of a cation exchange resin such as a sulfonic acid cation exchange resin or a carboxylic acid cation exchange resin preferably in hydrogen form, with the quinazolone base. A product is obtained wherein the cation of the quinazolone compound replaces the hydrogen or other cation of the resin, thus forming an adsorption compound or resinate. This adsorption compound when administered to a patient is acted upon by the ions in the gastric and intestinal juices and undergoes an ion exchange reaction whereby the pharmaceutically acceptable salt such as the hydrochloride or the free base in solution is formed in the gastric intestinal tract. Where slow release of the quinazolone compound from the resin is desired, the sulfonic acid cation exchange resin should be used to form the resinate.

The compounds of this invention may be administered alone but are generally administered with a pharmaceutical carrier. For example, they may be administered orally in the form of tablets or capsules containing such excipients as starch, clay, or the like, or in the form of elixir or oral suspension. This is true of the resinates as well as the free base and common salts. However, for parenteral and intramuscular administration the free base and common salts should be used.

The proportion of pyrazolidine compound to quinazolone compound is from the ratio of one part by weight pyrazolidine to two parts by weight quinazolone to the ratio of two parts by weight pyrazolidine to one part by weight of quinazolone; the optimum ratio being 1:1.

The physician will determine the dosage which will be most suitable; however, it has been found that dosage amounts of compositions within the above ratios can vary from about 50–400 milligrams each capsule or unit dose, using two capsules per day. These amounts are on the basis of the amount of free base.

*Example 1*

A suitable capsule unit dose consists of:

|  | Mg. |
|---|---|
| Phenyl butazone | 100 |
| 2-methyl-3-orthotolyl-4-quinazolones | 100 |
| Magnesium stearate | 2 |
| Dicalcium phosphate | 100 |
| Lactose | 75 |

*Example 2*

A tablet unit dose consists of:

|  | Mg. |
|---|---|
| 1 - phenyl - 2 - (2 - pyridyl) - 4 - butyl - 3,5 - dioxopyrazolidine | 100 |
| 2 - methyl - 3 - orthotrifluoromethylphenyl - 4 - quinazolones | 100 |

| | Mg. |
|---|---|
| Magnesium stearate | 2 |
| Dicalcium phosphate | 25 |
| Lactose | 75 |

I claim:

1. A therapeutic composition useful in treating premenstrual tension consisting essentially of a mixture of the following compounds in the ratio of 1:2 to 2:1:
a pyrazolidine having the formula

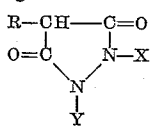

where R is selected from the group consisting of a lower alkyl and carboxyl low alkyl group, X is selected from the group consisting of phenyl, pyridyl and phenyl and pyridyl substituted by halogen, lower alkyl and lower alkoxy, and Y is selected from the group consisting of phenyl, pyridyl and phenyl and pyridyl substituted by halogen, lower alkyl and lower alkoxy; and their pharmaceutically acceptable acid addition salts;
and a quinazolone having the formula

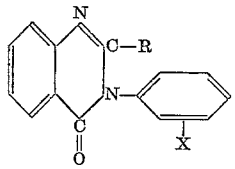

where R is selected from the group consisting of hydrogen and a lower alkyl, and X is hydrogen, alkyl, halogen, or trifluoromethyl; and their acid addition salts.

2. A therapeutic composition useful in treating premenstrual tension consisting essentially of
a mixture of
1 - phenyl - 2 - (pyridyl) - 4 - (butyl) - 3,5 - dioxopyrazolidine and 2-methyl-3-tolyl-4-quinazolone, in the ratio of 1:2 to 2:1.

3. A therapeutic composition useful in treating premenstrual tension consisting essentially of
a mixture of
3,5 - dioxo - 1,2 - diphenyl - 4 - n - butyl - pyrazolidine and 2 - methyl - 3 - (trifluoromethylphenyl)-4-quinazolone, in the ratio of 1:2 to 2:1.

4. A therapeutic composition useful in treating premenstrual tension consisting essentially of a mixture of
1-phenyl-2-(2-pyridyl)-4-(butyl)-3,5-dioxopyrazolidine and
2-methyl-3-(trifluoromethylphenyl)-4-quinazolone, in the ratio of 1:2 to 2:1.

5. A method for the treatment of premenstrual tension which comprises administering to a patient a pharmaceutical formulation containing a mixture of 3,5-dioxo-1,2-diphenyl-4-n-butyl-pyrazolidine and 2-methyl-3-tolyl-4-quinazolone in the ratio of 1:2 to 2:1.

References Cited in the file of this patent
UNITED STATES PATENTS

| 2,562,830 | Stenzl | July 31, 1951 |
| 2,864,824 | Michelson | Dec. 16, 1958 |

OTHER REFERENCES

Williams: Detoxication Mechanisms, Wiley and Sons, Inc., 1947, page 194.
Yale: J. of Med. and Pharm. Chem., vol. 1, No. 2, page 121, 1959.
Gujral: Chem. Abs., vol. 51, 15787(h), 1957.
Gujral: Chem. Abs., vol. 50, 6662(b), 1957.